US012548000B2

(12) United States Patent
Jesudian

(10) Patent No.: US 12,548,000 B2
(45) Date of Patent: Feb. 10, 2026

(54) SOCIAL MEDIA MARKETPLACE

(71) Applicant: PAYPAL, INC., San Jose, CA (US)

(72) Inventor: Elango Israel Gabriel Jesudian, Celbridge (IE)

(73) Assignee: PAYPAL, INC., San Jose, CA (US)

(*) Notice: Subject to any disclaimer, the term of this patent is extended or adjusted under 35 U.S.C. 154(b) by 13 days.

(21) Appl. No.: 18/435,524

(22) Filed: Feb. 7, 2024

(65) Prior Publication Data
US 2024/0303617 A1    Sep. 12, 2024

Related U.S. Application Data

(63) Continuation of application No. 17/827,061, filed on May 27, 2022, now Pat. No. 11,928,657, which is a continuation of application No. 16/854,637, filed on Apr. 21, 2020, now Pat. No. 11,392,913, which is a continuation of application No. 15/496,923, filed on Apr. 25, 2017, now Pat. No. 10,628,812, which is a
(Continued)

(51) Int. Cl.
*G06Q 20/12* (2012.01)
*G06Q 30/0251* (2023.01)
*G06Q 30/06* (2023.01)
*G06Q 30/0601* (2023.01)
*G06Q 50/00* (2012.01)

(52) U.S. Cl.
CPC ......... *G06Q 20/12* (2013.01); *G06Q 30/0255* (2013.01); *G06Q 30/06* (2013.01); *G06Q 30/0631* (2013.01); *G06Q 30/0641* (2013.01); *G06Q 50/01* (2013.01)

(58) Field of Classification Search
CPC .... G06Q 20/12; G06Q 30/0255; G06Q 30/06; G06Q 30/0631; G06Q 30/0641; G06Q 50/01
USPC ...................................................... 705/3–44
See application file for complete search history.

(56) References Cited

U.S. PATENT DOCUMENTS

| 6,963,848 | B1 | 11/2005 | Brinkerhoff |
| 7,069,234 | B1* | 6/2006 | Cornelius ............... G06Q 40/00 705/26.8 |
| 7,343,322 | B1 | 3/2008 | Mulderry et al. |

(Continued)

OTHER PUBLICATIONS

Jiang et al., "A Privacy-Preserving E-Commerce System Based on the Blockchain Technology", IWBOSE 2019, Hangzhou, China 978-1-7281-1807-9/19/$31.00 c 2019 IEEE. (Year: 2019).*

(Continued)

*Primary Examiner* — Frantzy Poinvil
(74) *Attorney, Agent, or Firm* — HAYNES AND BOONE, LLP

(57) ABSTRACT

Methods and systems are provided for facilitating shopping for products that have been liked to a social media network. A product can be seen on a merchant's website, for example. The product can be liked by user to the social media website. When the same or a different user subsequently sees the liked product on the social media website, the same or different user can purchase the product from the social media website. Thus, the user is not required to visit the merchant's website to perform the purchase transaction. Upon completion of the purchase, the user can be allowed to leave feedback to rate the item according to a predefined scale, which can be visible to all those who view the item, as exhibited by a vendor on the social media platform.

20 Claims, 4 Drawing Sheets

Related U.S. Application Data continuation of application No. 13/785,936, filed on Mar. 5, 2013, now Pat. No. 9,633,398.

(56) References Cited

U.S. PATENT DOCUMENTS

| | | | |
|---|---|---|---|
| 7,996,270 | B2 | 8/2011 | Sundaresan |
| 8,108,260 | B2 | 1/2012 | Maguire et al. |
| 8,117,126 | B1 | 2/2012 | Postrel |
| 8,170,919 | B2 | 5/2012 | Barbour et al. |
| 8,170,921 | B2 | 5/2012 | Stocker |
| 8,321,290 | B2 | 11/2012 | Chow et al. |
| 8,560,458 | B2 | 10/2013 | Hamdane et al. |
| 8,706,560 | B2 | 4/2014 | Sundaresan |
| 8,756,108 | B2 | 6/2014 | Stocker |
| 9,134,215 | B1 | 9/2015 | Vignisson et al. |
| 9,785,625 | B1 | 10/2017 | Swerdlow et al. |
| 9,954,962 | B2 | 4/2018 | Blackhurst et al. |
| 10,311,506 | B1 | 6/2019 | Frederick et al. |
| 10,607,169 | B1 | 3/2020 | Carlisle et al. |
| 11,361,336 | B1 | 6/2022 | Almosilhi |
| 11,763,360 | B1* | 9/2023 | O'Connor .............. G06Q 30/06 705/26.1 |
| 2007/0011104 | A1* | 1/2007 | Leger .................... G06Q 20/085 705/77 |
| 2007/0299745 | A1 | 12/2007 | Mulderry et al. |
| 2009/0106120 | A1 | 4/2009 | Canfield |
| 2011/0047013 | A1 | 2/2011 | Mckenzie, III |
| 2012/0078749 | A1 | 3/2012 | Scipioni |
| 2012/0150598 | A1 | 6/2012 | Griggs |
| 2012/0226530 | A1* | 9/2012 | Gebb .................... G06Q 20/384 705/14.1 |
| 2012/0232953 | A1 | 9/2012 | Custer |
| 2013/0073377 | A1* | 3/2013 | Heath .................... G06Q 30/02 705/14.39 |
| 2013/0103472 | A1 | 4/2013 | Burgess et al. |
| 2013/0191723 | A1 | 7/2013 | Pappas et al. |
| 2013/0304582 | A1 | 11/2013 | Beazley et al. |
| 2014/0032332 | A1 | 1/2014 | Atli |
| 2014/0052587 | A1 | 2/2014 | Bereck et al. |
| 2014/0081750 | A1 | 3/2014 | Hosp |
| 2014/0089135 | A1 | 3/2014 | Linh et al. |
| 2014/0095307 | A1 | 4/2014 | Dodson et al. |
| 2014/0101036 | A1 | 4/2014 | Phillips et al. |
| 2014/0258097 | A1 | 9/2014 | Jesudian |
| 2015/0018326 | A1 | 1/2015 | Jiang et al. |
| 2015/0019326 | A1 | 1/2015 | Russell et al. |
| 2015/0025996 | A1 | 1/2015 | Fishman et al. |
| 2015/0026015 | A1 | 1/2015 | Fishman et al. |
| 2015/0088686 | A1 | 3/2015 | Glassberg et al. |
| 2016/0012465 | A1 | 1/2016 | Sharp |
| 2016/0063493 | A1 | 3/2016 | Howe |
| 2016/0063598 | A1* | 3/2016 | Vad .................... G06Q 30/0631 705/26.7 |
| 2016/0234322 | A1 | 8/2016 | Blackhurst et al. |
| 2016/0379213 | A1 | 12/2016 | Isaacson et al. |
| 2017/0076309 | A1 | 3/2017 | Baron et al. |
| 2017/0228712 | A1 | 8/2017 | Jesudian |
| 2017/0236196 | A1 | 8/2017 | Isaacson et al. |
| 2017/0330235 | A1 | 11/2017 | Pathak et al. |
| 2017/0345105 | A1 | 11/2017 | Isaacson et al. |
| 2019/0080351 | A1 | 3/2019 | Garg et al. |
| 2021/0012407 | A1 | 1/2021 | Kumar et al. |
| 2021/0224858 | A1 | 7/2021 | Khoury et al. |
| 2023/0360109 | A1* | 11/2023 | Isaacson ............ G06Q 30/0635 |
| 2024/0013283 | A1* | 1/2024 | Isaacson ............... H04L 63/083 |
| 2024/0220978 | A1* | 7/2024 | Perreault ................ G06Q 20/40 |

OTHER PUBLICATIONS

Kryllidis et al., "Card-present Transactions on the Internet using the Smart Card Web Server", 12th IEEE International Conference on Trust, Security and Privacy in Computing and Communications (Year: 2013).*

"Beyond, You've had a Web site for years. Now What?," 2010, Backbone, 4 pages.

Buchanan L., et al., "The New Basics of Marketing," Feb. 2008, Inc.Magazine, 8 pages.

Chopenko A., "Social Media—A New Frontier For Counterfeits?," Retrieved from Internet URL: https://www.mondaq.com/china/social-media/932370/social-media--a-new-frontier-for-counterfeits, May 15, 2020, 3 pages.

Perez S., "Ribbon Raises $1.6M From Tim Draper Others, Launches New Way To Take Payments Directly In The Facebook News Feed," Retrieved from Internet URL: https://techcrunch.com/2013/02/05/payments-startup-ribbon-raises-1-6m-from-tim-draper-others-launches-new-way-to-take-payments-directly-in-the-facebook-news-feed/, Feb. 5, 2013, 5 pages.

Vicky S., "Beware Scams If You Are Looking To Save Cash And Stay In Fashion," The Herald, Jul. 8, 2017, 2 pages.

Yakimin Y., et al., "Social Proof in Social Media Shopping: an Experimental Design Research," SHS Web of Conferences, 2017, vol. 34, No. 02005, 7 pages.

* cited by examiner

SOCIAL MEDIA MARKETPLACE

CROSS REFERENCED TO RELATED APPLICATIONS

This application is a continuation of U.S. application Ser. No. 17/827,061, filed May 27, 2022, which is a continuation of U.S. application Ser. No. 16/854,637 filed Apr. 21, 2020, now issued as U.S. Pat. No. 11,392,913 on Jul. 19, 2022, which is a continuation of U.S. application Ser. No. 15/496,923 filed Apr. 25, 2017, now issued as U.S. Pat. No. 10,628,812 on Apr. 21, 2020, which is a continuation of Ser. No. 13/785,936, filed on Mar. 5, 2013, now issued as U.S. Pat. No. 9,633,398 on Apr. 25, 2017, the contents of which are incorporated by reference in their entirety.

BACKGROUND

Technical Field

The present disclosure generally relates to electronic commerce and, more particularly, relates to methods and systems for facilitating sells of products via social media platforms and the like.

Related Art

Social media have become very popular. Social media are typically accessed via the Internet and include websites that facilitate interactions among people. The people can share information among members of virtual communities. The information can relate to any desired topics. For example, people can share experiences and ideas regarding food, travel, religion, cars, music, movies, hobbies, or science via social media websites.

Common social media websites include FaceBook, Twitter, LinkedIn, Pinterest, MySpace, LiveJournal, Tagged, and Orkut. There are many other social medial websites. Some social media websites are general interest websites and some social media websites are for members that share a particular interest.

Merchants often provide links to social media websites. Social media website members can "like" products of the merchants to their social media website to indicate to others that they enjoy or like the products. Such liking of a product provides an indication of the user's approval, e.g., a recommendation of the product, on the social media website where other members can view the recommendation. The merchants believe that such liking provides effective advertising for their products. That is, the merchants expect that other social media website members will see that such products have been liked by a member and will then purchase the products.

DETAILED DESCRIPTION

Figure 1:
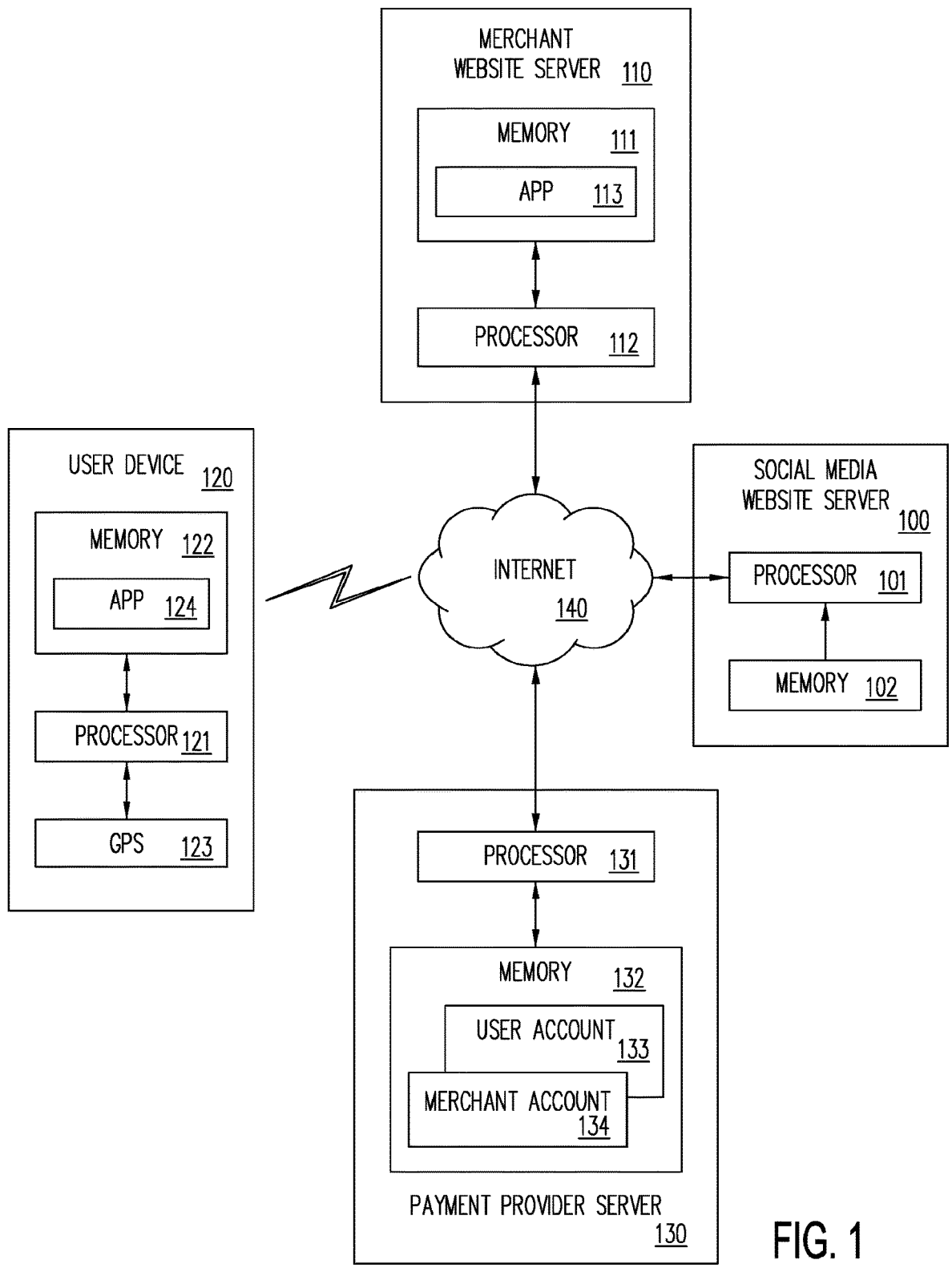
FIG. 1 is a block diagram of a system for providing a social media marketplace, according to an embodiment.

According to an embodiment, a user can "like", shop, and leave feedback for a product. As those familiar with social media will appreciate, liking a product is a process whereby a user sees a product that the user wants and/or wants to recommend to others. The user selects the product so that the product can be displayed on a social media website for the others to see and potentially purchase and/or leave feedback regarding. The product can be liked to a social media website, to a payment provider website, or to any other suitable type of website.

According to an embodiment, the liking, purchasing, and leaving of feedback can all be done conveniently from a single app, such that a merchant's likelihood of completing a sale is substantially enhanced. For example, the app can be an app of the social media website, an app of a payment provider, or an app of both the social media website and the payment provider. That is, the payment provider and the social media website can cooperate to provide the app. For example, a merchant and the user can both participate in a payment provider/social media website app.

The app can be executed on a mobile device of the user. The app can be executed on any suitable device of the user, e.g., a desktop computer, smart phone, or computing tablet. With the app, the user can like the product to the social media website, access the social media website, view feedback regarding the product, purchase the product and/or leave feedback regarding the product. The like can be stored on a payment provider app center of the social media website. The like can be stored at any desired location on any desired website. The user can later navigate to the app center or other website to view liked products. The liked products can be displayed, such as via icons, at the app center. The user can select a liked product and use the PayPal Buy Now feature, for example, to purchase the liked product. Thus, the user can select to Buy Now from the user's previously stored likes and can also see how many other users have left feedback for the same product.

In this manner, casual website visits can be converted into purchases. For example, a user who sees a product that the user would like to purchase on a website of the merchant can like the product to the user's social media website. Liking the product can initiate the app, such as in a mobile device with which the user is viewing the merchant's website. Alternatively, the user can initiate the app, such as by clicking on or tapping an icon on a screen of a computer or a mobile device.

The app can provide the user with an opportunity to purchase the product. Any incentives that the merchant offers can be communicated to the user via the app to encourage the user to purchase the product. By providing the user with the opportunity to conveniently purchase the item at the time that the user likes the item, the likelihood of the merchant making a sale is substantially enhanced. The user can be provided the opportunity to purchase the product at the time that the product is liked and/or at a later time, such as when the user is viewing the product on the social media website.

According to one or more embodiments, methods and systems are provided for facilitating shopping for products that have been liked to a social media network. The products can be purchased directly from the social media website. As discussed above, liking a product is comparable to providing a recommendation for the product.

A product can be seen on a merchant's website, for example. The product can be liked by user to the user's social media website. When the same or a different user subsequently sees the liked product on the social media website, the same or different user can purchase the product from the social media website.

The same or different user can purchase the product directly from the social media website. Thus, the user is not required to visit the merchant's website to perform the purchase transaction. According to an embodiment, the user is not required to visit any other website to perform the purchase transaction. By making such online purchases easier and more convenient for the user, the sales of products for the merchant can be desirably enhanced.

Even though the user is not required to visit any other website, the app, the social media website, or some other device, program, company, or entity can cooperate with one or more other websites to perform the purchase transaction. For example, the social media website can cooperate with the payment provider and/or the merchant website to perform the purchase transaction. However, such cooperation can be behind the scenes with respect to the user and can thus effectively be invisible to the user.

The products can be purchased from the social media website, i.e., without the user having to go explicitly to the merchant's website. The purchase transaction can be processed entirely within the social media website. The purchase transaction can be process partially within the social media website and partially within another entity, such as a payment provider website or the merchant website. The purchase transaction can be processed within the merchant website. The purchase transaction can be processed within any combination of websites and other entities. For example, the purchase transaction can be processed by any combination of the social media website, the payment provider, a bank, a credit card company, a payment processor, the merchant, and/or any other entity.

Regardless of where the purchase transaction is processed, the user can remain within the social media website. Thus, the user is spared the trouble and inconvenience of having to leave the social media website to go to the merchant's website. Of course, the more convenient it is for a potential customer to make a purchase, the more likely it is that the potential customer will actually make the purchase. Thus, according to one or more embodiments, merchants may increase their sales.

According to contemporary practice, a user who sees a liked item on a social media website must leave the social media website to purchase the item. However, the user may be reluctant to leave the social media website. The user may prefer to remain within the social media website to perform the function that attracted the user to the social media website in the first place. For example, the user may prefer to proceed to viewing another friends latest updates on the social media website. Thus, the user can easily be distracted from the liked product that the user is otherwise ready to purchase. The user may forget altogether about the product. The user may see and purchase a competing product. Thus, it is beneficial to capture the purchase when user is ready to make the purchase, but is reluctant to do so by leaving the social media website.

According to an embodiment, a system can comprise one or more memories storing information of a social media website. One or more hardware processors can be in communication with the one or more memories and can receive a first communication from a first user device to the social media website that is indicative that a first user likes a product of a merchant. The one or more hardware processors can store information associated with the first user liking (e.g., a like) for the product in the one or more memories and can display the like for the product on the social media website. The one or more hardware processors can receive a second communication from a second user device to the social media website that is indicative that a second user desires to purchase the product from the merchant. The one or more hardware processors can process a purchase transaction for the user to purchase the product from the merchant.

The first communication can be provided via an app of the first user device. The app can be an app of a payment provider and a social media website, such that aspects of the social media marketplace are more readily practiced. For example, such an app can more readily coordinate cooperation between the payment provider and the social media website to process purchase transactions, as disclosed herein.

The social media website can provide the Buy Now feature that facilitates purchase of the product by the user from within the social media website. As those skilled in the art will appreciate, such a Buy Now feature can comprise an icon that the user can select to initiate a purchase transaction for a selected product. Thus, by clicking on the Buy Now icon, for example, the user can be presented with payment and shipping choices for the purchase.

The app can provide the Buy Now feature that facilitates purchase of the product by the user via the mobile device, such as without visiting any website. The app can maintain a database of product liked by the user. The user can use the Buy Now feature to purchase any such items. The app can cooperate with the social media website, the merchant website, the payment provider website, and/or any other company, device, program or entity to process the purchase. The app can similarly facilitate the purchase of products that have been liked by others, such as others who have been specified by the user. The app can similarly facilitate the purchase of products that have been liked by friends of the user, such as friends of the user who are defined outside of the app, such as on the social media website. The app can obtain a list of such friends from the social media website, for example.

In this manner, the user can purchase previously liked product without having to explicitly visit any websites. Any cooperation between the app and any websites can be behind the scenes and effectively invisible to the user.

The first communication includes information regarding the product and the information can be provided by a website of the merchant. Thus, information regarding the product can be provided to the social media website when the user likes the product to the social media website. This information can be displayed by the social media website. For example, information regarding the product, such as product features and pricing, can be displayed when a user move a cursor over the product on the social media website. Alternatively, the product and the information can be taken from an email of the merchant.

The product information can be provided to the social media website from any source or combination of sources. After the product has been liked to the social media website, the social media website, the merchant website, the payment provider website, or any other entity can obtain further information regarding the product and can provide this further information to the social media website.

The first user device and the second user device can be the same user device. The same user or different users can user the same device to like the product and to purchase the product. Thus, the first user and the second user can be the same user. Generally, one user can like the product to the social media website and any number of users, including the user who liked the product, can purchase the product via the social media website.

The one or more hardware processors and the one or more memories can be processors and memories of a server. For example, the one or more hardware processors and the one or more memories can be processors and memories of the payment processor, the social media website, or any other entity.

According to an embodiment, a method can comprise storing, in one or more memories, information of a social media website. The method can comprise receiving, via one or more hardware processors, a first communication from a first user device to the social media website indicative that a first user likes a product of a merchant; storing, via the one or more hardware processors, a like for the product in the one or more memories; displaying, via the one or more hardware processors, the like for the product on the social media website; and receiving, via the one or more hardware processors, a second communication from a second user device to the social media website indicative that a second user desires to purchase the product from the merchant. The method can comprise processing, via the one or more hardware processors, a purchase transaction for the user to purchase the product from the merchant.

According to an embodiment, the one or more hardware processors can be configured to facilitate leaving feedback, e.g., rating the product on a predefined scale (such as a scale of 1-10) which is then displayed to all who view the item on the social media platform from the particular vendor.

According to an embodiment, a computer program product can comprise a non-transitory computer readable medium. The non-transitory computer readable medium can have computer readable and executable code for instructing one or more processors to perform any of the methods disclosed herein.

According to an embodiment, direct purchases can be made using a payment provider, such as PayPal. Publicly visible feedback can be left by the purchaser regarding the purchased products. Thus, various forms of online selling can be extended to various forms of social media.

FIG. 1 is a block diagram of a system for providing a social media marketplace, according to an embodiment. The system can include a social media website server 100, a merchant website server 110, a user device 120, and/or a payment provider server 130. The functions discussed herein can be split and/or shared among social media website server 100, the merchant website server 110, the mobile device 120, and/or the payment provider server 130, as desired.

The social media website server 100 can comprise a processor 101 and a memory 102. The memory 102 can be in communication with the processor 101. The social media website server 100 can provide a social media website via the Internet, for example.

The merchant website server 110 can comprise a memory 111 and a processor 112. The memory 111 can be in communication with the processor 112. The merchant website server 110 can provide a merchant website via the Internet, for example. A app 113 can be stored in the memory 111. The app 113 can be executed by the processor 112 and/or communicated to the user device 120.

The user device 120 can comprise a processor 121, a memory 122, and a global positioning system (GPS) 123. The user device 120 can comprise a computer, such as a desktop computer. The user device 120 can comprise a mobile device and can comprise carried by the user. The user device 120 can comprise a cellular telephone, a smart telephone, a hand held computer, a laptop computer, a notebook computer, or a tablet computer, for example. The user device 120 can be used for routine telephone calls, text messaging, web browsing, and the like.

An app 124 can be stored in the memory 122 and can be executed by the processor 121. The app 124 can be substantially the same as the app 113. The app 113 and/or the app 124 can be used for facilitating the social media marketplace, according to an embodiment. The app 124 can be stored elsewhere, such as on the social media website server 100, the merchant website server 110, and/or the payment provider website 130. The app 124 can be stored and executed from any desire location or combination of locations.

The GPS 123 can be used to provide location information that can be used to facilitate the social media marketplace, according to an embodiment. For example, the GPS 123 can provide a location of the user during a purchase transaction. The location of the user can be used to determine a brick and mortar store, warehouse, or other facility from which the user can will call or pick up a purchased product. As a further example, the GPS 123 can be used inform friends of the user regarding the user's location when any products are liked or purchased by the user.

The location of the user can be used, at least in part, to verify or authorize the purchase transaction. For example, the user can specify, such as during a set up process, that purchases can only be made when the user device is within pre-specified boundaries (such as within a city, region, state, or country). In this manner, fraudulent or illegitimate transactions and/or social media entries and the like can be mitigated.

The payment provider server 130 can comprise a server of a payment provider, such as Paypal, Inc. The payment provider server 130 can be a single server or can be a plurality of servers. The payment provider server 130 can include one or more processors 131 and a memory 132. The memory 132 can be a memory of the payment provider server 130 or a memory that is associated with the payment provider server 130. The memory 132 can be a distributed memory. The memory 132 can store a user account 133 and a merchant account 134. The payment provider server 130 can be used to facilitate purchase transactions, as disclosed herein.

Generally, the social media website server 100, the merchant website server 110, the user device 120, and the payment provider server 130 can perform functions discussed herein. That is, at least to some extent, a function that is discussed herein as being performed via one of these devices can be performed by a different one of these devices or by a combination of these devices.

The merchant website server 110, the user device 120, and the payment provider server 130 can communicate with one another via a network, such as the Internet 140. The merchant website server 110, the user device 120, and the payment provider server 130 can communicate with one another via one or more networks, such as local area networks (LANs), wide area networks (WANs), cellular telephone networks, and the like. The merchant website server 110, the user device 120, the social network 150, and the payment provider server 130 can communicate with one another, at least partially, via one or more near field communications (NFC) methods or other short range communications methods, such as infrared (IR), Bluetooth, WiFi, and WiMax.

FIG. 1 illustrates an exemplary embodiment of a network-based system for implementing one or more processes described herein. As shown, the network-based system may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Figure 2:
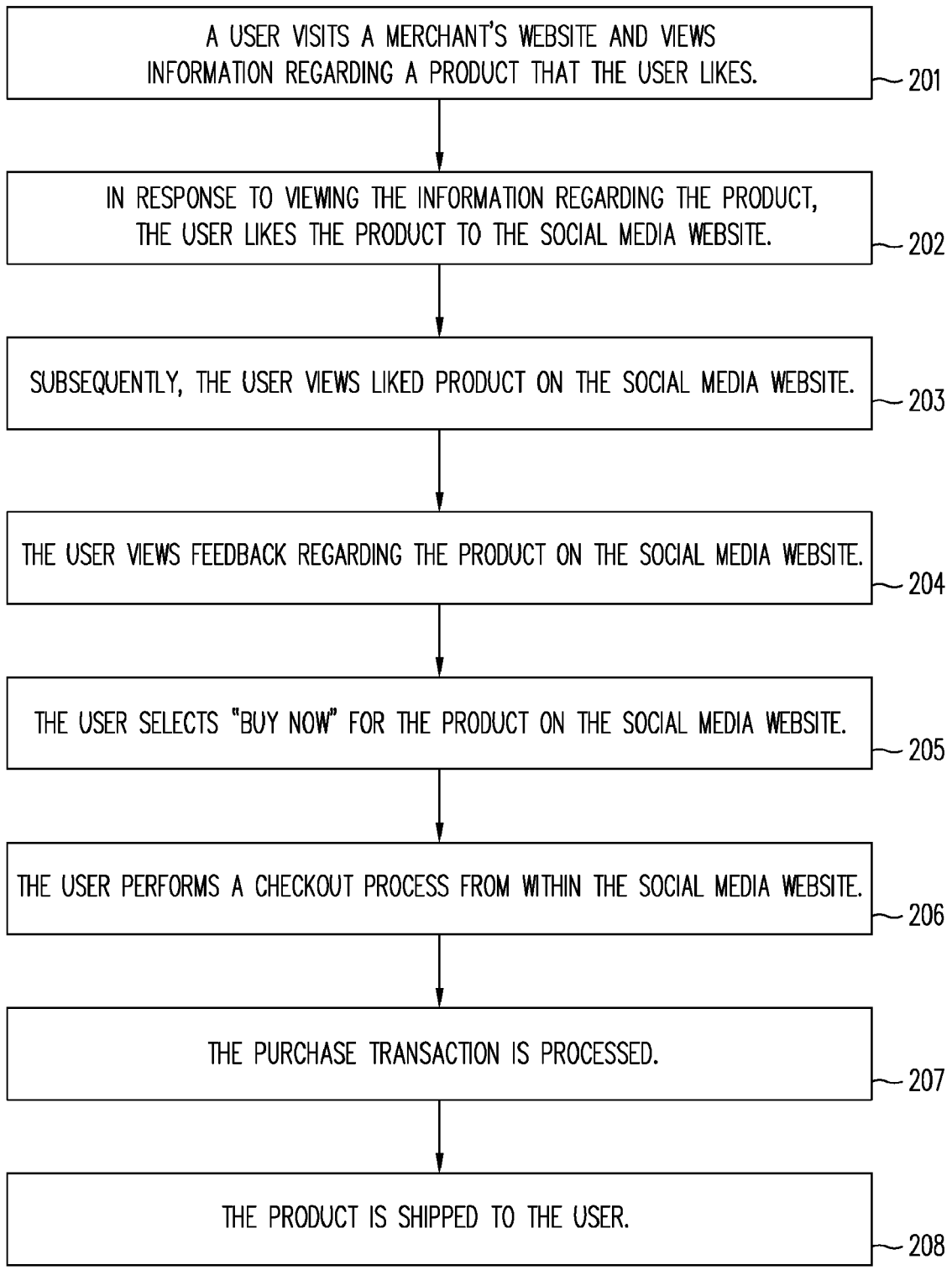
FIG. 2 is a flow chart showing a method for providing a social media marketplace, according to an embodiment.
Figure 3:
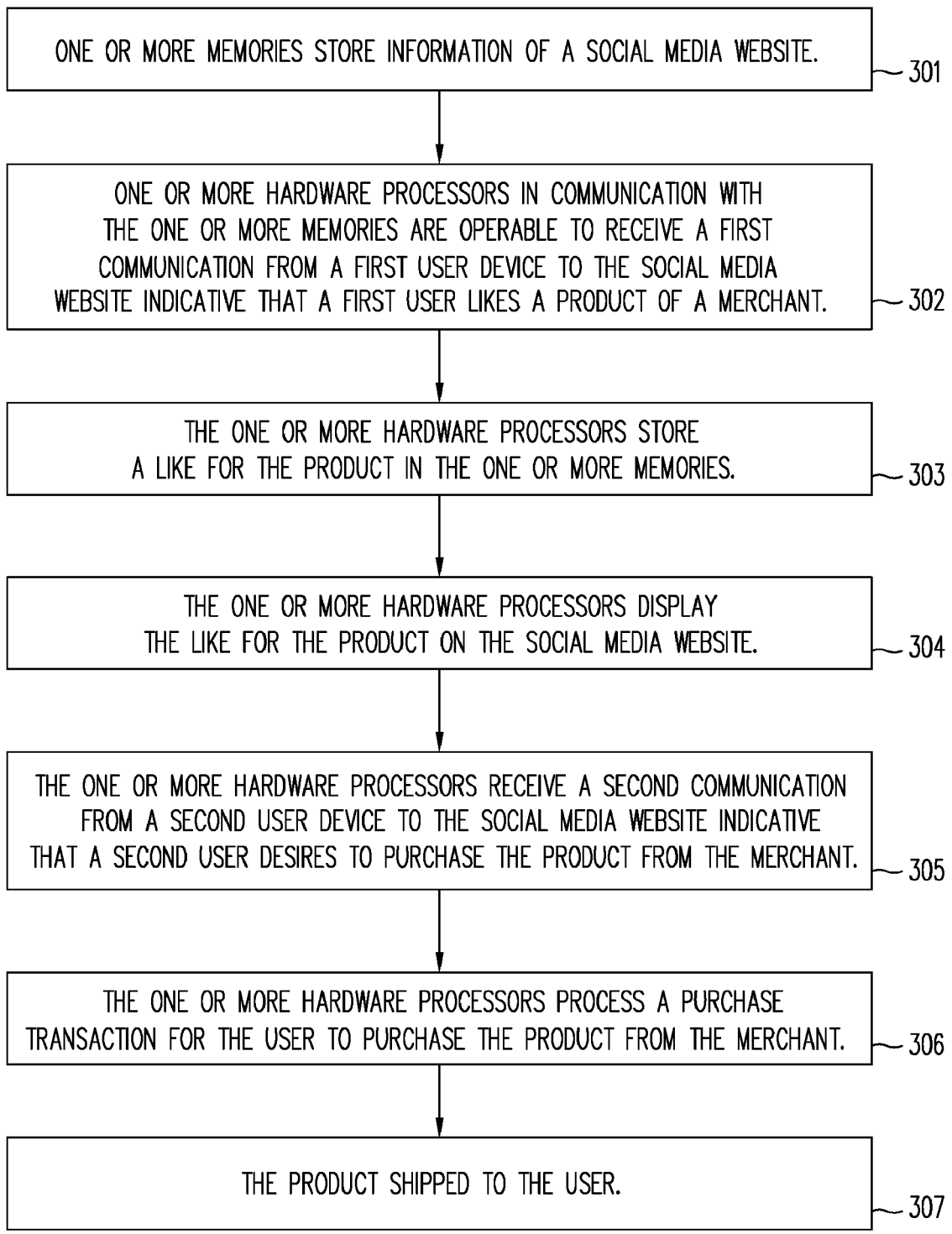
FIG. 3 is a flow chart showing further detail of the method for providing a social media marketplace, according to an embodiment.

FIGS. 2 and 3 are flow charts that describe examples of operation of the social media marketplace according to embodiments thereof. Note that one or more of the steps described herein may be combined, omitted, or performed in a different order, as desired or appropriate.

FIG. 2 is a flow chart showing a method for providing a social media marketplace, according to an embodiment. A user can visit a merchant's website and can view information regarding a product that the user likes, as shown in step 201. The information can be an advertisement for the product. The website can be viewed on the user device 120, for example. The user can alternatively receive an email, text message, or otherwise electronically receive the information regarding the product.

In response to viewing the information regarding the product, the user can like the product to the social media website 100, as shown in step 202. The user can like the product to one social media website or the user can like the product to a plurality of social media websites. The user can like the product to any number of social media websites and/or to any number of other websites.

Subsequently, the user can view the liked product on the social media website, as shown in step 203. Either the same user or a different user can view the social media website. The social media website can be viewed with either the same user device 120 or a different user device 120. Any number of users can view the liked product on the social median website or other website.

The user can view feedback regarding the product on the social media website, as shown in step 204. The feedback can include a number of stars to indicate how much the product was liked or disliked by reviewers. For example, the feedback can include a five star system where one star indicates dissatisfaction with the product and five stars indicates a recommendation for the product. Comments of the reviewers can be provided.

The feedback can be provided by other members of the social media website. They may be such feedback or there may be no feedback. The feedback can be on the social media website or can be elsewhere, such as on another website. One or more links can be provided on the social media website to other websites that contain feedback. According to an embodiment, no feedback can be provided or the user can skip viewing any feedback that is provided.

The user can select "Buy Now" for the product, such as on the social media website, as shown in step 205. Selecting Buy Now can initiate a purchase transaction for the user to purchase the product. The user can purchase the product from within the social media website. That is, the user is not required to leave the social media website and/or visit the merchant's website to purchase the product. The social media website, the payment provider, and/or the merchant can cooperate to facilitate the purchase process. Any other desired entity, e.g., a credit card company, bank, payment processor, can also cooperate to facilitate the purchase process.

The user can perform a checkout process from within the social media website, as shown in step 206. The checkout process can be a standard checkout process that is similar to that performed from the merchant's website. For example, the user can specify how many units of the product are to be purchased, where and how the product is to be shipped, and how to pay for the product. The checkout process can be performed entirely from within the social media website. Alternatively, the checkout process can be performed partially within the social media website and partially outside of the social media website. For example, the social media website server 100 can control and coordinate the checkout process using various other, different websites and/or servers.

The purchase transaction can be processed, as shown in step 207. The purchase transaction can be processed by the social media website (e.g., by the social media server 100), by the payment provider (e.g., by the payment provider server 130), and/or by the merchant website (e.g., by the merchant server 110). The purchase transaction can be processed by any suitable entity or device.

The product can be shipped to the user, as shown in step 208. The product can be shipped to the user by a method specified by the user during the checkout process. The product can be shipped to the user by any desired method. Once the product has been marked as "shipped" to the buyer on the social media platform, the buyer is then allowed to leave feedback (such as rating the item on a certain scale) regarding that particular item (which can be marked as purchased by the buyer). This feedback can be displayed to all who view that item on the social media platform.

FIG. 3 is a flow chart showing further detail of the method for providing a social media marketplace, according to an embodiment. One or more memories can store information of a social media website, as shown in step 301. The one or more memories can comprise the memory 102 of the social media website server 100, for example. The one or more memories can comprise the memory 111 of the merchant website 110, the memory 132 of the payment provider server 130, the memory 122 of the user device 120, and/or any other memory or memories. The one or more memories can comprise any suitable memory or combination of memories.

One or more hardware processors can be in communication with the one or more memories and can be operable to receive a first communication from a first user device to the social media website indicative that a first user likes a product of a merchant, as shown in step 302. The one or more hardware processors can comprise the processor 101 of the social media website server 100, for example. The one or more hardware processors can comprise the processor 112 of the merchant website 110, the processor 131 of the payment provider server 130, the processor 121 of the user device 120, and/or any other processor or processors. The one or more hardware processors can comprise any suitable hardware processor or combination of hardware processors.

The one or more hardware processors can store a like for the product in the one or more memories, as shown in step 303. The like can be stored in the memory 103 or any other suitable memory. The one or more hardware processors can display the like for the product on the social media website, as shown in step 304. Thus, the like can be viewed by the user, by other users or social media website members, and/or by others.

The one or more hardware processors can receive a second communication from a second user device to the social media website indicative that a second user desires to purchase the product from the merchant, as shown in step 305. The one or more hardware processors can process a purchase transaction for the user to purchase the product from the merchant, as shown in step 306. The purchase can be made with a check, credit card, bank card, a gift card, payment provider, a payment token, or any other payment means.

Once the purchase transaction has been completed, the product can be shipped to the user, as shown in step 307. Such shipping can be requested and performed according to any desired method.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

Figure 4:
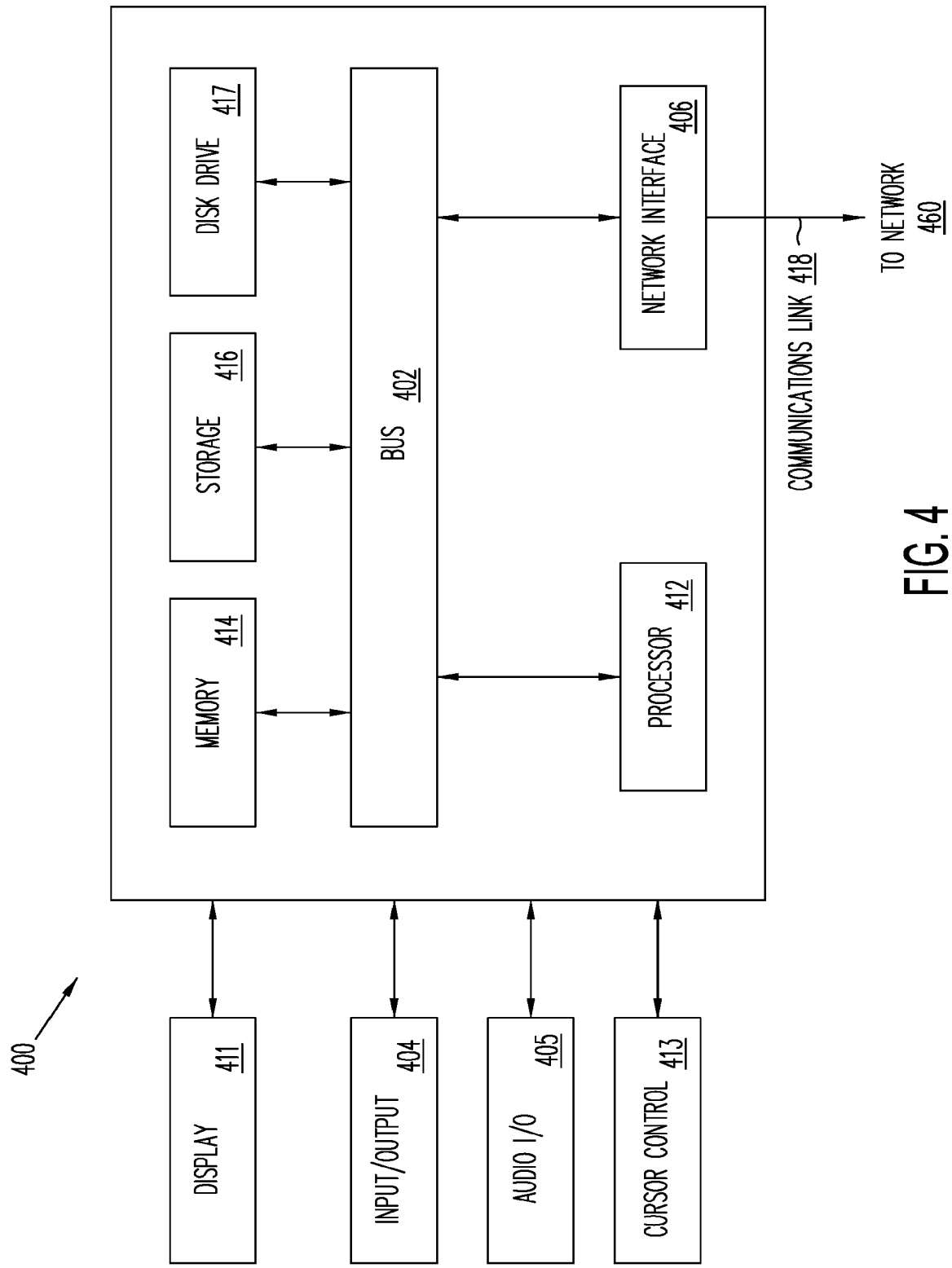
FIG. 4 is a block diagram of an example of a computer that is suitable for use in the system for providing a social media marketplace, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, hotel rooms, automotive repair, haircuts, digital music, and books. The product can be a single item or a plurality of items. For example, the product can be a tube of toothpaste, a box of laundry detergent, three shirts, and a donut.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the term "card" can refer to any card or other device that can be used to make a purchase in place of cash. For example, the card can be a bank card, credit card, debit card, gift card, or other device. The card can be a token, such as a hardware token or a software token. The card can be stored in and/or displayed upon a user device, such as a cellular telephone.

As used herein, the term "app" can include any application, software, or program that can be run on any device such a desktop computer, a mobile computer, a smart telephone, or the like.

As user herein, the term "like" can be defined as information associated with one of the users liking a product. Thus, a "like" can indicate approval of or desire for a product.

The social media marketplace can extend to the whole world wide web. That is, any merchant on the world wide web can participate. Thus, product for such merchants can be liked and/or purchased via the social media marketplace disclosed herein. Trust for seller among potential buyer can be enhanced via feedback. Feedback can provide a means for identifying and eliminating fraudulent and otherwise undesirable sellers. Little or no change to existing payment provider infrastructure is required.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

The invention claimed is:

1. A method, comprising:
   accessing, by one or more electronic processors of a payment provider and via an application associated with an electronic platform, an electronic interaction between a first user and a product displayed via the application associated with the electronic platform, wherein the electronic platform is configured to enable electronic communications among a plurality of users that include the first user, and wherein the electronic interaction comprises an indication that the first user likes the product or wants to recommend the product to other users of the plurality of users;
   automatically recording, by the one or more electronic processors of the payment provider, the indication into an electronic database;
   causing, by the one or more electronic processors of the payment provider, the application to display one or more graphical elements that correspond with the electronic interaction, wherein the one or more graphical elements comprise an icon that indicates the product associated with the indication of the favorable reaction is ready for purchase;
   determining, by the one or more electronic processors of the payment provider, that a click of the icon was made by one or more users of the plurality of users via the application;
   accessing, by the one or more electronic processors of the payment provider, a geographical location of the one or more users; and
   automatically initiating, by the one or more electronic processors of the payment provider based on the determined click of the icon and on a determination that the geographical location of the one or more users is within a pre-specified boundary, a transaction involving a purchase of the product by the one or more users via the application.

2. The method of claim 1, wherein:
the product comprises a product offered for sale by a third party merchant via the electronic platform; and
the transaction is automatically initiated without the first user visiting a website of the third party merchant.

3. The method of claim 1, wherein the one or more users is the first user.

4. The method of claim 1, wherein the one or more users is a second user different from the first user.

5. The method of claim 1, wherein the transaction is conducted without the one or more users leaving the electronic platform.

6. The method of claim 1, wherein:
the electronic interaction was made via a first mobile device; and
the click of the icon was made via one or more second mobile devices different from the first mobile device.

7. The method of claim 1, wherein the electronic interaction contains information regarding a point in time at which the electronic interaction was made.

8. The method of claim 1, wherein the one or more graphical elements further contain information regarding a total number of reactions from the plurality of users with respect to the product.

9. The method of claim 1, wherein the payment provider is different from an entity that provides the electronic platform.

10. The method of claim 1, wherein the icon comprises a selectable button.

11. The method of claim 1, wherein the pre-specified boundary is user-definable during a set up process.

12. A system, comprising:
a processor; and
a non-transitory computer-readable medium having stored thereon instructions that are executable by the processor to cause the system to perform operations comprising:
detecting, via an application associated with an electronic platform, an electronic interaction from a first user of the electronic platform with a graphical element displayed via the application associated with the electronic platform, the electronic platform enabling interactions among a plurality of users that include the first user, wherein a display of the graphical element occurs in response to a positive feedback from the first user or from a second user of the plurality of users with respect to a product previously displayed via the application associated with the electronic platform, wherein the positive feedback indicates that the first user or the second user likes the product or wants to recommend the product to other users of the plurality of users, wherein the positive feedback from the first user or from the second user is automatically saved in an electronic database, and wherein the graphical element comprises an icon that indicates that the product is ready for purchase;
determining, based on the detected electronic interaction, that the first user intends to initiate a transaction involving a purchase of the product by the first user via the application;
determining a location of a mobile device of the first user; and
automatically processing, based on the determining that the first user intends to initiate the transaction and when the location of the mobile device is within a pre-specified boundary, the transaction via the application while the first user remains on the electronic platform.

13. The system of claim 12, wherein the location of the mobile device is determined via a global positioning system (GPS).

14. The system of claim 12, wherein the product is offered for sale by a third party merchant via the electronic platform, and the transaction is automatically processed without the first user visiting a website of the third party merchant.

15. The system of claim 12, wherein:
the positive feedback with respect to the product was made via a first device; and
the electronic interaction with the graphical element was made via a second device different from the first device.

16. A non-transitory machine-readable medium having stored thereon machine-readable instructions executable to cause a machine to perform operations comprising:
electronically storing, in a specified location of an electronic platform, one or more electronic interactions between one or more users and a product displayed via an application associated with the electronic platform, wherein the electronic platform provides a network that allows interactions among a plurality of users that includes the one or more users, wherein the one or more electronic interactions comprise one or more indications by the one or more users like the product or wants to recommend the product, and wherein the one or more indications are automatically stored in a database of the electronic platform;
causing, in response to a visit of the specified location of the electronic platform from a first user, a display of a graphical element that comprises an icon that indicates the product is ready for purchase;
detecting a click of the icon from the first user via the application; and
automatically initiating, based on the detected click of the icon and on a determination that a geographical location of the first user when the click of the icon is detected is within a particular geographical location, a transaction involving a purchase of the product on behalf of the first user via the application.

17. The non-transitory machine-readable medium of claim 16, wherein the transaction is automatically initiated without the first user leaving the electronic platform.

18. The non-transitory machine-readable medium of claim 16, wherein the first user is different from any of the one or more users.

19. The non-transitory machine-readable medium of claim 16, wherein:
the product comprises a product offered for sale by a third party merchant via the electronic platform; and
the transaction is automatically initiated without the first user visiting a website of the third party merchant.

20. The non-transitory machine-readable medium of claim 16, wherein the graphical element further indicates a total number of indications with respect to the product.

* * * * *